Oct. 11, 1949.
L. W. ANTHONY
2,484,666
ATTACHMENT FOR HAYRAKES TO OPERATE
HAYRAKES FROM TRACTOR SEATS
Filed Oct. 7, 1947
2 Sheets-Sheet 1
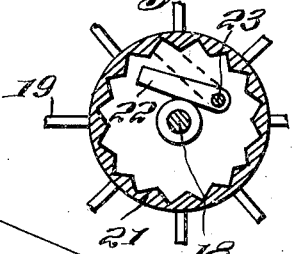
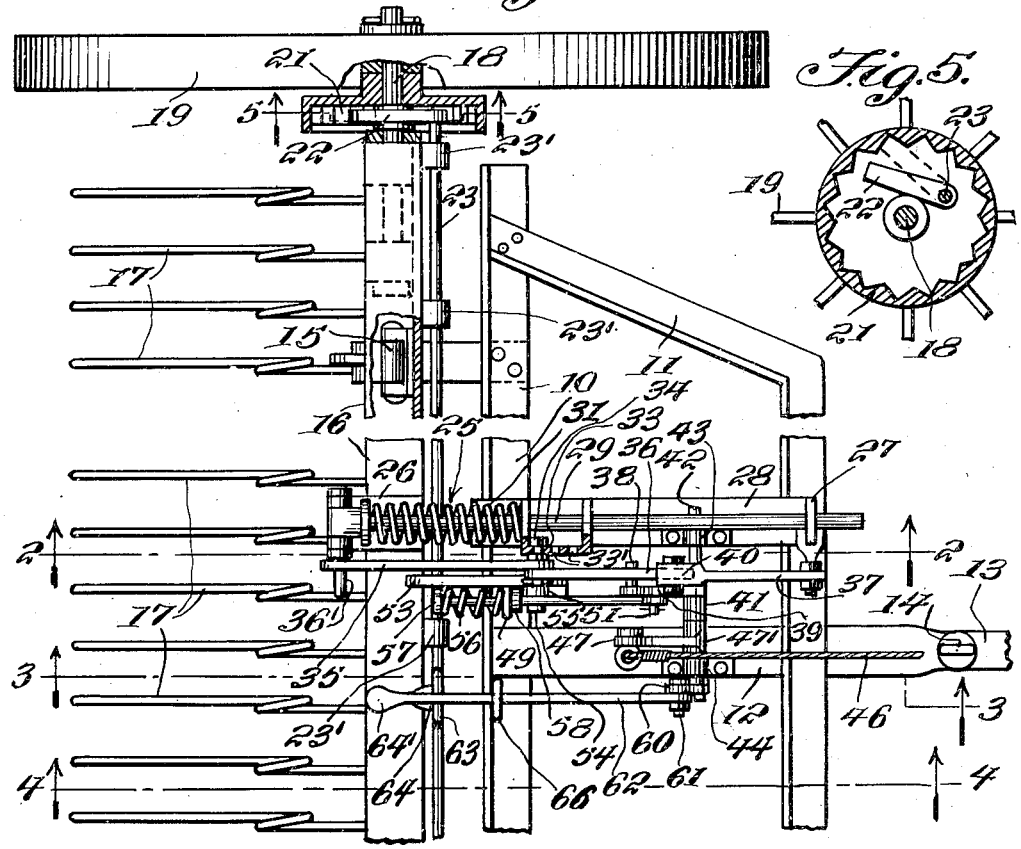
INVENTOR.
Louis W. Anthony,
BY Victor J. Evans & Co.
ATTORNEYS

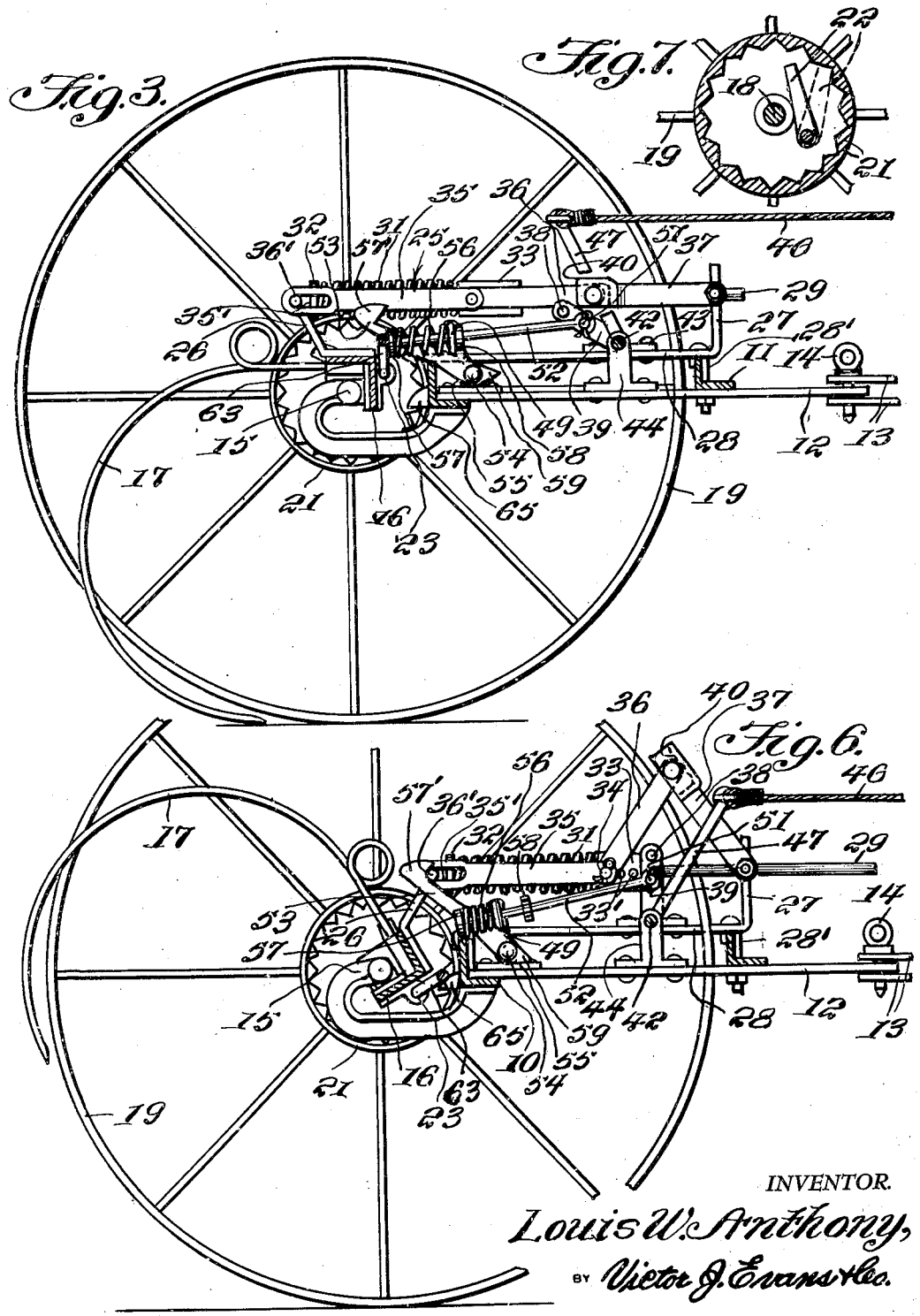

Patented Oct. 11, 1949

2,484,666

UNITED STATES PATENT OFFICE 2,484,666

ATTACHMENT FOR HAYRAKES TO OPERATE HAYRAKES FROM TRACTOR SEATS

Louis W. Anthony, Albany, Oreg.

Application October 7, 1947, Serial No. 778,407

3 Claims. (Cl. 56—387)

1

This invention relates to dump rakes, and more particularly to the trip mechanism for effecting the actuation of the rake lift to dump the rake.

It is an object of the present invention to provide a trip mechanism for a dump rake which can be operated from a distant location such as the operator's seat on a tractor by a pull rope or cord extended to a convenient location on the tractor.

Other objects of the present invention are to provide a trip mechanism for a dump rake, which is of simple construction, durable and sturdy, inexpensive to manufacture, adapted to be used with a hold down arrangement, efficient in operation.

For a better understanding of the invention, reference may be had to the following detailed description taken with the accompanying drawing, in which:

Figure 1 is a fragmentary top plan view partly broken away of the rake incorporating the trip mechanism of the present invention;

Figure 2 is a fragmentary cross-sectional view taken on line 2—2 of Figure 1;

Figure 3 is a cross-sectional view taken on line 3—3 of Figure 1;

Figure 4 is a fragmentary cross-sectional view taken generally on line 4—4 of Figure 1;

Figure 5 is a cross-sectional view taken through the lifting gear at the wheel and generally on line 5—5 of Figure 1;

Figure 6 is a transverse cross-sectional view taken generally on the line 3—3 of Figure 1, as Figure 3 is taken but with the parts located in the positions to retain the rake teeth in an elevated position above the ground, and Figure 7 is a cross-sectional view taken generally on the line 5—5 of Figure 1, as Figure 5 is taken, but with the parts located in the position to cooperate with the position shown in Figure 6.

Referring now to the figures, 10 represents a transversely supporting angle iron frame with a forwardly extending angle iron portion 11 thereon and a tongue 12 for connecting the rake to a tractor hitch bar 13 by a hitch pin 14. Pivotally connected to this frame 10 by hinge connections 15 is a transversely extending angle iron bar 16 to which rake teeth 17 are connected. Extending from the opposite ends of the bar 16 are stub axles 18 on which supporting wheels 19 are journalled. Associated with the hub of each wheel 19 is a circular notched element or rack 21 into engagement with which latches or dogs 22 can be extended at times when it is desired to dump the rake. The latches 22 are fixed to opposite ends of

2 a trip rod 23 pivotally mounted on the bar 16 by hangers 23'. With the latches 22 in engagement with the element 21, as shown by dotted lines, Figure 5, the wheels will pull upwardly the rake teeth and pivot the transverse bar 16 in relation to the frame 10.

To hold the rake teeth on the ground when in operation, there is provided a hold down spring arrangement 25. This arrangement includes a rod 29 which is pivotally connected at its rear end by a pin 36' to a bracket 26 secured to the transverse bar 16, and at its forward end is slidable through an upwardly turned portion 27 of a supporting plate 28, the plate 28 being secured to the frame 10 and portion 11 by hook bolts 28'.

Sleeved on the rod 29 is a spring 31, which is adapted to react at its rear end against a disc flange 32 on the rod 29, and at its forward end against the adjustable U-shaped slide 33 sleeved on the rod 29. To this slide 33, there is selectively connected by means of the relatively spaced openings 33', a pin 34, on which is loosely mounted one end of the tensioning links 35.

The link 35, at its opposite end, is provided with the elongated slot 35' which engages the pin 36' outwardly of the bracket 26. When the slide 33 is slid toward or away from the bracket 26, it tensions the spring accordingly to the opening 33' in which the pin 34 is located, the spring in turn tensioning the teeth 17 of the rake. However, should the lower end of the teeth strike an obstruction on the ground, the pin 36' movable in the slot 35' permits the teeth to ride upwardly to permit the teeth to clear the obstruction, thus preventing the teeth from breaking or otherwise damaging the rake by an unexpected sudden stop caused by the engagement of the teeth with the obstruction. Also connected to pin 34, outwardly of the link 35, is one end of a pair of toggle links 36 and 37 having the break joint stop 40 to prevent collapse of the links in the conventional manner. The links 36 and 37 are adapted to be broken at their pivot by the engagement of a break joint pin 38, on an arm 39, with the link 36. The arm 39 is extended from a sleeve 41 which is mounted on a shaft 42 journalled in brackets 43 and 44 secured to the plate 28, and tongue 12 respectively. A sleeve 47' is also mounted on the shaft 42 abutting the sleeve 41, and the sleeve 47' is rotated when a pull cord 46 connected to an arm 47 formed on the sleeve 47' is pulled forwardly.

The pull cord is extended forwardly to a convenient location adjacent the operator's seat on the tractor, so that the operation of the arm is caused by the operator at a distant location from the rake. The sleeves 41 and 47' are adapted to be fixed to the shaft 42 by a set screw or any other well known fastening means. Thus when the sleeve 47' is rotated, the shaft 42 is rotated, so that arms 39 and 47 are simultaneously moved, and the toggle links are broken, as previously described.

Pivoted on the pin 51, fixed to the center of the arm 39, is a rod 52, and this rod has sliding engagement within an eye 49 formed on the latch 53, which latch is pivoted by a pin 54 mounted in the bracket 55 fixed to the frame 10.

Sleeved on the rod 52 is a spring 56 which, at its rear end, reacts against an enlargement 57 on the rear end of the rod 52 and against the eye 49 at its forward end. The spring 56 is adapted to return the rod 52 rearwardly, whereby to slightly pivot arm 39 rearwardly and to return the pin 38 from its engagement with the link 36.

The spring 56 will only move the arm 39 to place the parts associated therewith at an off-center position, at which time the weight of the rake will, by gravity, return the rake to operating position. However, the rake cannot return to operating position until the hooked end 57' of the latch 53 is disengaged from the pin 36'. This action is obtained through the medium of an enlargement 58 formed on the rod 52 outwardly of the eye 49 engaging the eye 49 and pushing it rearwardly as the arm 39 is moved rearwardly by action of the rod 29. In its forward movement, the latch 53 is limited by the projection or stop 59 formed on the lower end abutting the bracket 55 in which the latch 53 is mounted.

When the pull cord 46 is moved forwardly, the trip rod 23 is operated, at the same time that the shaft 42 is rotated, by an arm 60 fixed on the outer end of the rod 42. The arm 60 being connected by a pin 61 to a trip bar 62, causes the trip bar 62 to be pulled forwardly, so that the notch 64 on the bar 62 will engage the U-shaped projection 63 of the trip rod, and the dog latch 22 will engage with the notches in the element 21, as shown by dotted lines, Figure 5. A weight 64' formed rearwardly from the notch 64 on the trip rod 62 maintains engagement of the notch 64 with the projection 63. The dog 22 will be released upon the projection 63 of the trip rod engaging with a projection 65 on the frame 10, as shown in Figure 7. The rod 62 is slidably mounted in the projection 66 secured to the frame 10, so that it is always mounted in true alined operating engagement with the projection 53.

In operation, when it is desired to raise the teeth 17 out of engagement with the ground, the pulled cord 46 is moved forwardly. Movement of the cord 46 moves the arm 47 forwardly, turning the shaft 42. Turning of the shaft 42 moves the arm 39 to cause the pin 38 to engage the link 36 and break the toggle links 36 and 37 respectively. Simultaneously with the movement of arms 47 and 39, the arm 60 is caused to move by the shaft 42. The arm 60 pulls the trip rod 62 forwardly, engaging the notch thereon with the projection 63 on the trip rod 23, causing the dog 22 to engage the element 21 to raise the teeth 17. As the rod 29 moves forwardly, the arm 39 is pulling the rod 52 forwardly, so that the hooked end of the latch 53 will, when in proper position, engage the pin 36'. The raising of the rod 52 is accomplished by the action of the enlargement 57 on the opening 56. The pin 36' can pass over the hooked end in its forward movement since the spring 56 can be slightly compressed for this action, but once the pin has passed the hooked end, the spring will force the hooked end into engagement with the pin 36'.

When the wheels 19 through element 21 and dog 22 have raised the teeth to the position shown in Figure 6, the U-shaped projection 63 will engage the projection 65 on the frame 10 to move the trip rod 23 rearwardly. This action causes the dog 22 to become disengaged from the elements 21, as shown in Figure 7. Thus the rake can be dumped or be moved with the teeth in raised position out of engagement with the ground. The trip rod is retained in this position shown by dotted lines in Figure 5, or moved to the position shown in Figure 7 by gravity due to the weight of the dogs 22 reacting on the rod 23.

When it is again desired to use the teeth, the pull cord 46 is released. This action causes the spring 56 to move the rod 52 rearwardly, pulling the arms 39, 47 and 60 rearwardly until the arms have passed dead center. Thus the weight of the teeth 17 is now in a position to return the teeth to operational engagement with the ground. At this time the enlargement 58 on the rod 52 engages the eye 49 on the latch 53 to disengage the hooked end 57' of the latch from the pin 36'. Upon disengagement of the pin, the weight of the teeth will cause the teeth to drop into position. The toggle links will remake and hold the rod in tensioning position on the teeth, as previously described.

From the foregoing, it will be seen that there has been provided an efficient trip mechanism for effecting the actuation of the rake lift to dump the rake or place the rake in a position to move the rake to another location. The rake is dumped wherever desired by the rotation of the ground engaging wheels, and this movement is entirely controlled by the operator of the tractor to which the rake is hitched.

It is thought that from the foregoing description, that the advantages and novel features of the invention will be readily apparent to those skilled in the art.

While various changes may be made in the detailed construction, it shall be understood that those changes shall be within the spirit and scope of the present invention, as defined by the appended claims.

I claim:

1. An attachment for a hay rake having a main transversely extended frame, a bar pivoted on said frame, wheels journalled on said bar, and rake teeth connected to the bar to extend rearwardly therefrom, comprising a hold down arrangement connected between the frame and the transverse bar to normally retain the rake teeth upon the ground, said arrangement including a slide, a shaft containing the slide and adapted to be adjusted through its connection with the frame, toggle links extended between the slide on the rod and the frame, a link connected between the slide on the rod and a connection of the arrangement with the transverse bar, a pin projection on the connection of the arrangement with the transverse bar, a latch adapted to receive the pin projection as the transverse bar and the rake teeth are lifted to retain the transverse bar and the rake teeth in an elevated position on the frame, devices cooperating with the arrangement and the wheels to effect a lifting action of the transverse bar, means for operating said devices and means for simultaneously breaking the toggle links to release the hold down spring arrangement simultaneously with the operation of the lifting devices.

2. The invention as in claim 1, wherein said lift devices including a trip rod journalled on the transverse bar, a trip bar for operating said trip rod and dog latches on the ends of the trip rod adapted for engagement with notched elements carried by said wheels, and a rod on the frame adapted to engage the trip rod to disengage said dogs from said notched elements.

3. The invention as in claim 1, wherein said slide is provided with a series of openings therein, and said link through the pin is adapted to be connected to any one of the several openings, and a spring on said rod tensioned by said slide to limit the downward movement of the rake teeth and to retain the same at the desired location with relation to the ground.

LOUIS W. ANTHONY.

REFERENCES CITED

The following references are of record in the file of this patent:

UNITED STATES PATENTS

| Number | Name | Date |
| --- | --- | --- |
| 694,051 | Brown | Feb. 25, 1902 |
| 761,211 | Danner | May 31, 1904 |
| 2,300,164 | Musselman | Oct. 27, 1942 |